(No Model.) 2 Sheets—Sheet 1.
J. P. CHRISTOPHER & M. McCALLUM.
STOCK CAR.
No. 303,418. Patented Aug. 12, 1884.
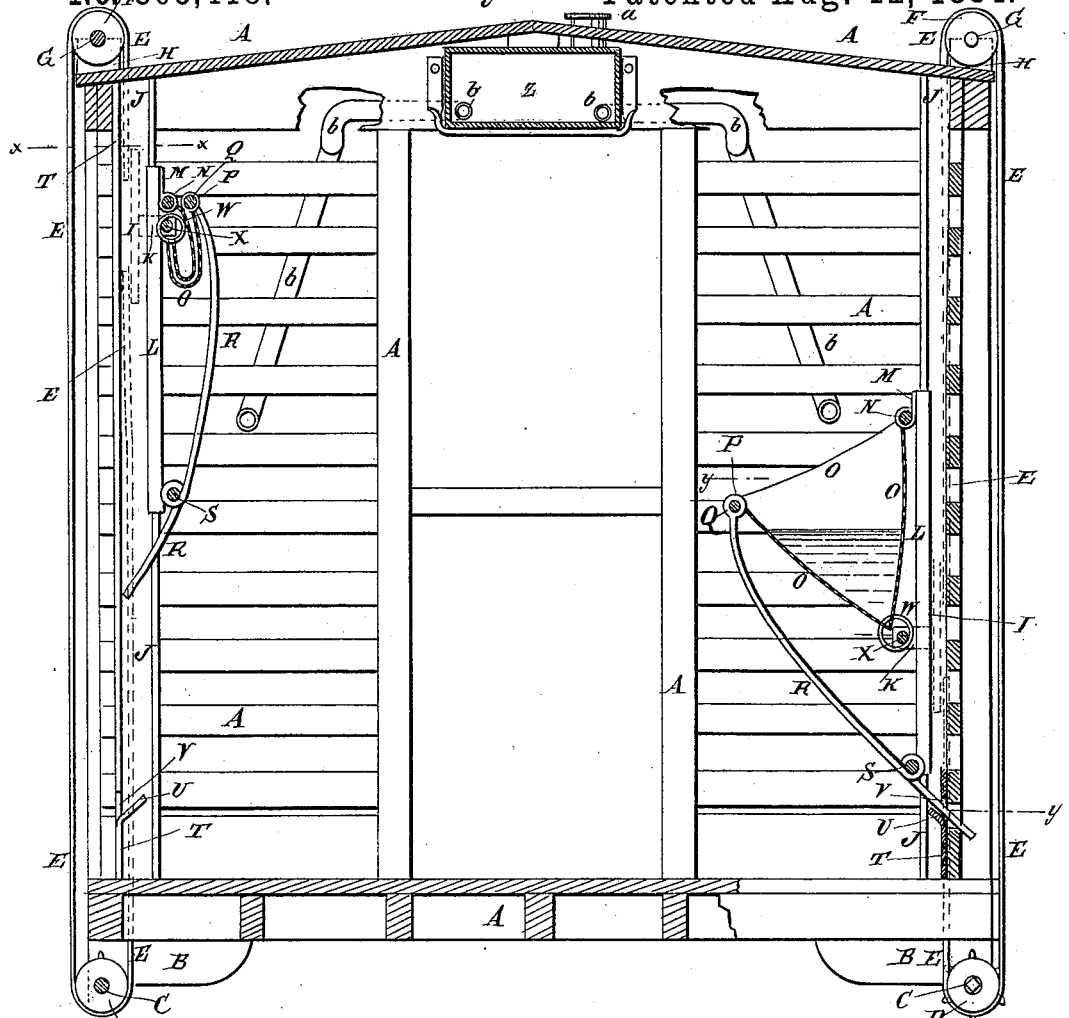
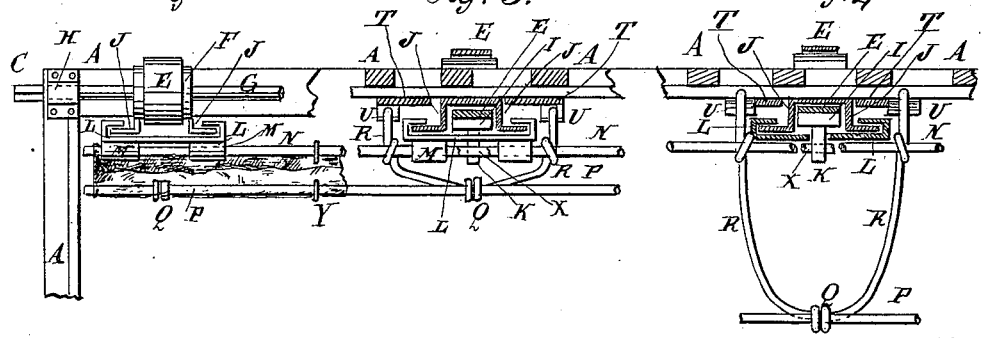
WITNESSES:
Chas. Nida.
C. Sedgwick.
INVENTOR:
J. P. Christopher
M. McCallum
BY Munn & Co.
ATTORNEYS.

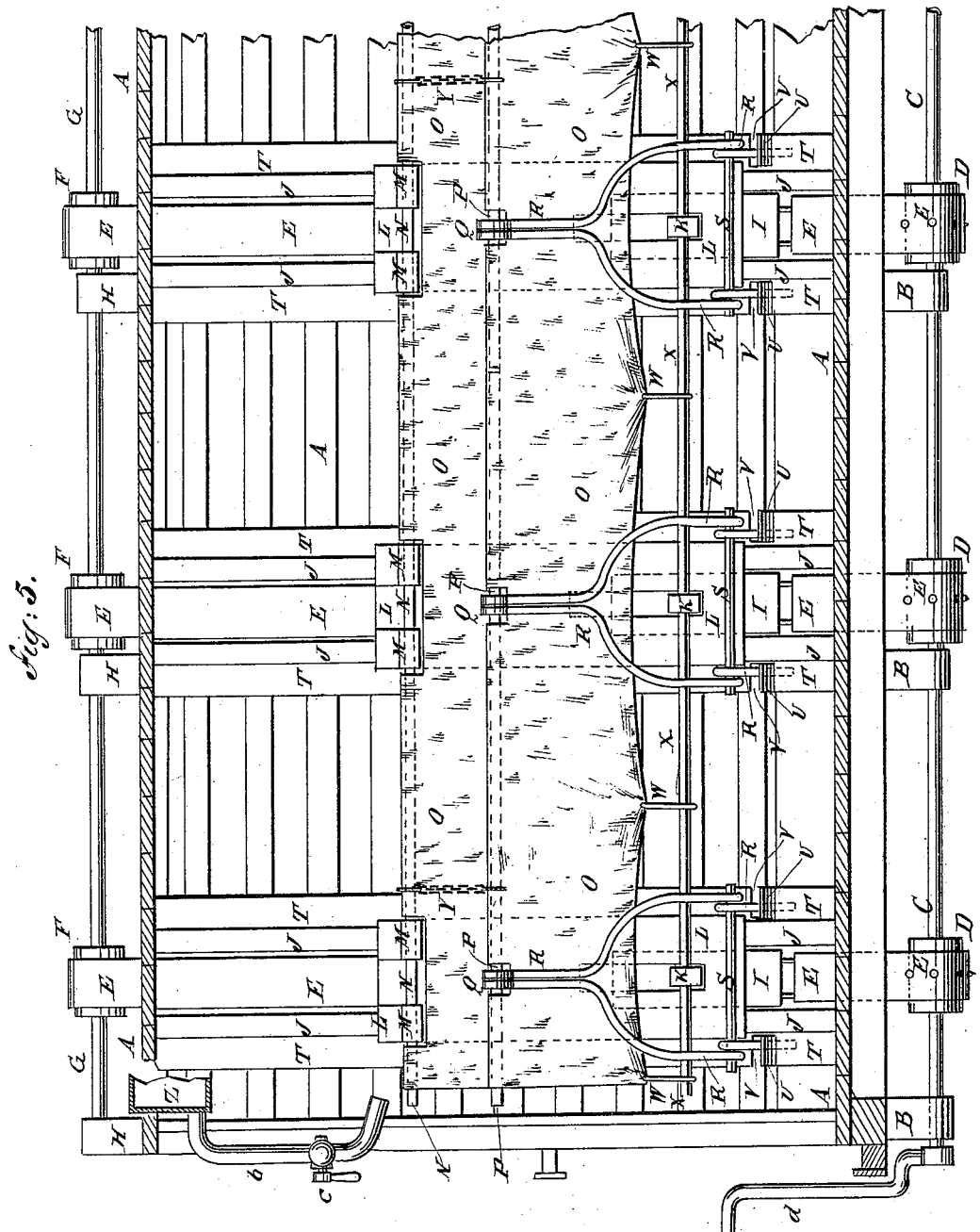

UNITED STATES PATENT OFFICE.

JOHN P. CHRISTOPHER AND MURRAY McCALLUM, OF MICHIGAMME, MICH.

STOCK-CAR.

SPECIFICATION forming part of Letters Patent No. 303,418, dated August 12, 1884.

Application filed May 19, 1884. (No model.)

*To all whom it may concern:*

Be it known that we, JOHN P. CHRISTOPHER and MURRAY McCALLUM, both of Michigamme, in the county of Marquette and State of Michigan, have invented certain new and useful Improvements in Watering-Troughs for Railway Cattle-Cars, of which the following is a full, clear, and exact description.

Reference is to be had to the accompanying drawings, forming part of this specification, in which similar letters of reference indicate corresponding parts in all the figures.

Figure 1, Sheet 1, is a sectional end elevation of a cattle-car to which our improvement has been applied. Fig. 2, Sheet 1, is a plan view of a part of our improvement, the car-roof being removed. Fig. 3, Sheet 1, is a sectional plan view of a part of the same, taken through the line $x$ $x$, Fig. 1, the trough being removed. Fig. 4, Sheet 1, is a sectional plan view of a part of the same, taken through the broken line $y$ $y$, Fig. 1, the trough being removed. Fig. 5, Sheet 2, is a sectional side elevation of a part of the same.

The object of this invention is to facilitate the watering of cattle while being transported in cars.

The invention consists in a watering-trough for cattle-cars, constructed with troughs made of flexible material and provided with slides, rods, and bars, arranged to fold the trough while being raised and open it while being lowered. To the sides of the car are attached guides to receive slides provided with projections carrying rods, and second slides slotted to receive the projections of the first slides, and provided with rods at their upper and lower ends, and with forked bars hinged to the lower rods, carrying rods at their upper ends, and having their lower ends projecting to be guided into openings in guard-plates attached to the sides of the car by lugs attached to the said guard-plates, the flexible trough being attached to the rods connected with the slides, and the said slides being provided with an operating mechanism, so that the said trough will be opened while being lowered and folded and closed while being raised. The trough-operating slides are provided with straps or chains connecting them with wheels and shafts, so that the said slides can be readily operated to lower and raise the troughs, as will be hereinafter fully described.

A represents an ordinary cattle-car.

To the base-frame of the car A are attached bearings B, in which revolves a shaft, C.

To the shaft C are attached four (more or less) spur or chain wheels, D, around which pass straps or chains E. The straps or chains E pass up along the outer sides of the car and pass over smooth wheels or rollers F, attached to a shaft, G, which revolves in bearings H, attached to the top of the car A. The ends of the straps or chains E pass toward each other along the inner sides of the car, and are attached to or connected with the opposite ends of slides I, which slide up and down in guides J, attached to the sides of the car. Upon the slides I are formed projections K, which pass through slots in slides L, which move up and down upon the guides J. The slides L have hook-flanges upon their side edges, to engage with flanges upon the sides of the guides J, as shown in Figs. 3 and 4.

To the upper parts of the slides L are attached bearings M, in which are secured rods N, extending the entire length of the car.

To the rods N are attached the outer edges of troughs O, made of rubber cloth or other waterproof flexible material. The inner edges of the troughs O are attached to rods P, secured to bearings Q in the upper ends of the bars R. The lower parts of the bars R are forked, and are hinged at a little distance from their lower ends to the ends of short rods S, secured at their middle parts to the lower parts of the slides L. As the slides L move up and down the lower ends of the bars R slide up and down upon plates T, attached to the sides of the car A. As the bars R approach the lower ends of their downward movements their lower ends strike inclined flanges or lugs U, formed upon or attached to the plates T, and are guided through openings V in the said plates T, so as to project at the outside of the car and allow the upper ends of the bars R to swing inward, opening the troughs O. The bottoms of the troughs O are connected by rings W or other suitable means with a rod, X, secured in bearings in the projecting ends of the projections K. The rods N P at the edges of the troughs O are connected by short chains Y or other suitable connections, to relieve the material from the strain should the cattle bear down upon the inner edges of the said troughs. In the upper parts of the cars A are secured water-tanks Z, which can be supplied with water from the tanks that supply the locomotives, and which are provided with spouts $a$, projecting through the roofs of the cars, for the convenient introduction of the water. From the ends of the tanks Z pipes $b$ lead down into such positions as to discharge water into the end parts of the troughs O when the said troughs are lowered and opened. The discharge-pipes $b$ are provided with stopcocks $c$, for controlling the discharge of the water. The ends of the shafts C are squared to receive separable cranks $d$, for convenience in turning the said shafts to adjust the troughs O.

When the troughs O are not in use, they are drawn up against the upper parts of the sides of the car, as shown in the left-hand part of Fig. 1. When the troughs are to be used, the shafts C are turned to lower the slides I. As the slides I move downward, the projections K, when they reach the lower ends of the slots in the slides L, engage with the said slides, and the two sets of slides move downward together. As the slides I move downward they carry the rods X with them, which draw down the bottoms of the troughs O. The bars R are carried down with the slides L, and when the lower ends of the said bars R reach the openings V they are guided through the said openings by the lugs U, which swings the upper ends of the said bars R and the rods P inward, opening the troughs O. The stop-cocks $c$ are then opened, and the desired quantity of water is admitted to the troughs. When the thirst of the cattle has been satisfied, the shafts C are turned in the opposite direction, and the slides I are raised. As the projections K reach the upper ends of the slots in the slides L they engage with the slides L, and the slides I L move up together. As the projections K move upward they carry the rods X with them, and fold up the bottoms of the troughs O.

As the upward movement of the slides L withdraws the bars R from the openings V, the pressure of the plates T against the lower ends of the bars R swings the upper ends of the said bars R and the rods P outward, closing the troughs O. The folded and closed troughs O are then raised to the upper parts of the sides of the cars, and remain there until again required for use.

If desired, the chains or belts E can be omitted, and the slides I L raised and lowered by means of swiveled screws operated from the crank-shafts C by beveled gear or friction wheels.

Having thus described our invention, what we claim as new, and desire to secure by Letters Patent, is—

1. A watering-trough for cattle-cars, constructed, substantially as herein shown and described, of flexible material, and provided with slides, rods, and bars, arranged to fold the trough while being raised and open it while being lowered, as set forth.

2. The combination, with the car A, of the guides J, the slides I, having projections K and rod X, the slotted slides L, having rods S, the hinged bars R, having rods P and projecting lower ends, the guard-plates T, having openings V and guide-lugs U, and flexible troughs O, connected with the rods N P X, and an operating mechanism, substantially as herein shown and described, whereby the said troughs will be opened while being lowered and folded and closed while being raised, as set forth.

3. The combination, with the car A and the trough-operating slides I, of the shafts C G, the wheels D F, and the straps or chains E, substantially as herein shown and described, whereby the said slides can be readily operated to lower and raise the troughs, as set forth.

JOHN P. CHRISTOPHER.
MURRAY McCALLUM.

Witnesses:
SAML. E. BYRNE,
CHAS. W. GREENE.